United States Patent Office 3,397,607
Patented Aug. 20, 1968

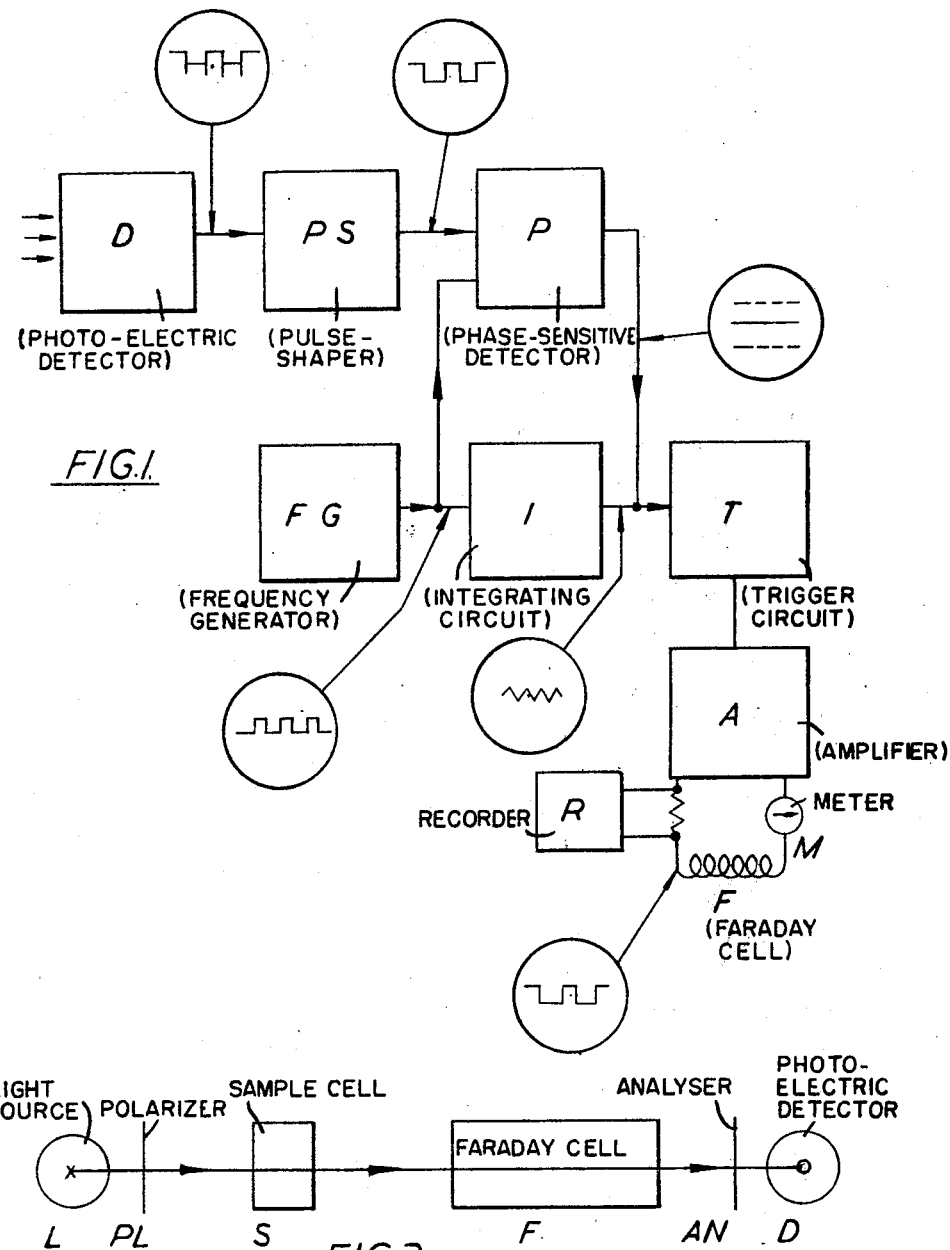

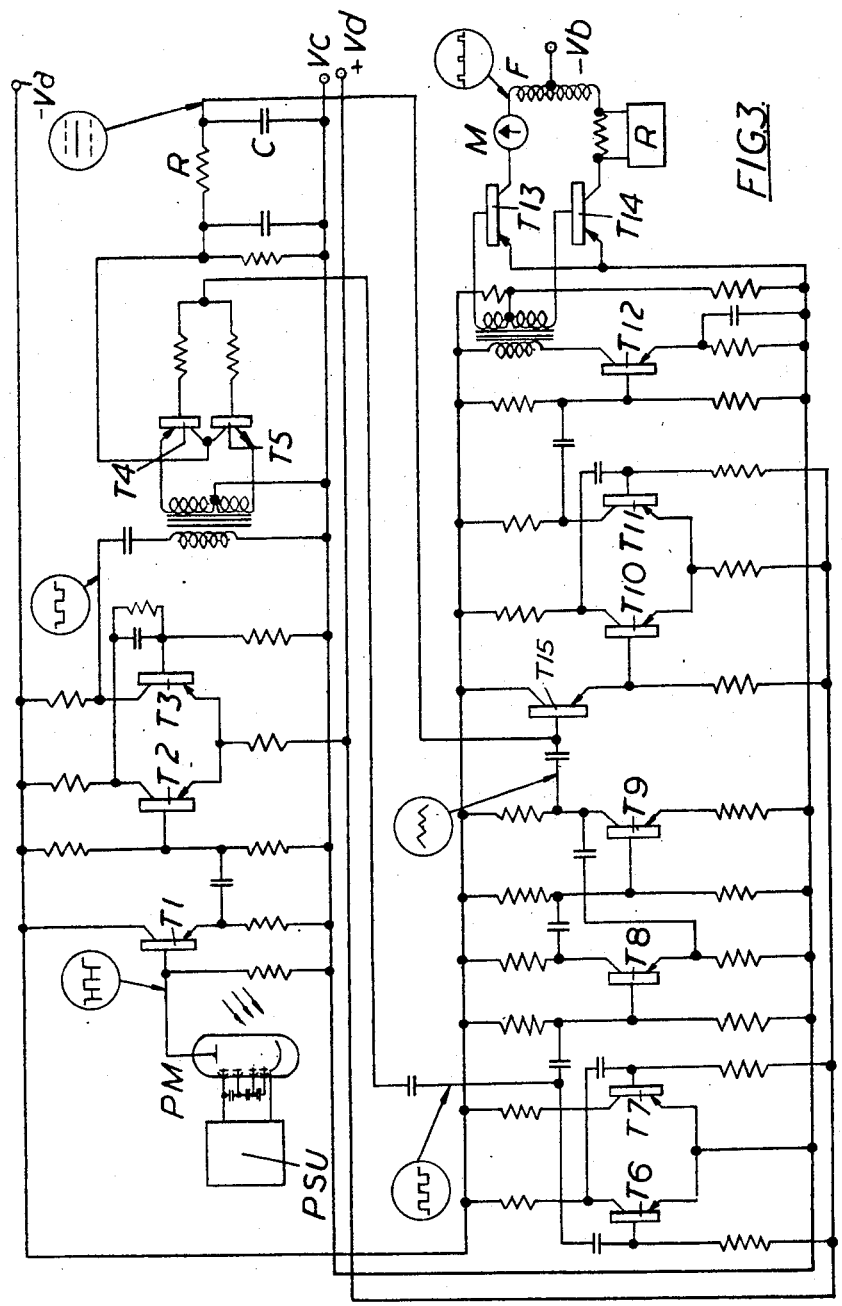

3,397,607
SINGLE FARADAY CELL POLARIMETER
John Knowles Goodwin, 3 Brookside Ave., East Leake, Loughborough, Leicestershire, England
Filed Oct. 31, 1963, Ser. No. 320,325
3 Claims. (Cl. 88—14)

The present invention relates to polarimeters of the type incorporating a Faraday cell.

Polarimeters are known which employ two Faraday cells. The first cell, the "modulator," is used to cause the plane of polarisation of a light beam passing through it to oscillate symmetrically about a given axis by applying to the coil of the Faraday cell, an oscillating control current having a symmetrical waveform with a one-to-one ratio. When a sample is placed in the polarimeter, this axis is angularly displaced. This displacement can be measured by using a second Faraday cell, the "compensator," and measuring the magnitude of the direct current applied to the coil of the Faraday cell which is necessary to restore the axis to its original position. A photoelectric detector is commonly used as a means of determining the position of the axis. The output signal from the photo-electric detector, which is indicative of the amount of the light received by the detector, is often used to control the magnitude of the "compensating" direct current.

Instead of employing two separate Faraday cells, attempts have been made to use a single cell having the two windings on it, but interference between the two windings was experienced in practice. In another known arrangement the single Faraday cell had a single winding only, and the compensating direct current was applied as a bias to the oscillating control signal, producing a combined signal having a wave-form of one-to-one ratio symmetrical about a new axis determined by the magnitude of the bias. Apparatus working on this basis gave rise to several difficulties. Among these was the difficulty experienced in obtaining circuit components with characteristics suitable for both the alternating current control signal and the direct current compensating signal. Again difficulty was experienced with the amount of heat developed and its deleterious effect on the optical performance of the apparatus.

According to the present invention there is provided a polarimeter which includes a single Faraday cell, means for applying to the Faraday cell an oscillating electric control signal having a wave-form of one-to-one ratio symmetrically disposed about an axis, and ratio adjustment means under the control of light variations received by a detector to adjust the ratio of said control signal.

Apparatus according to the invention overcomes in large measure the difficulties experienced with known types of polarimeter.

An embodiment of the invention in which the oscillatory electric signal is a square-wave signal will now be described by way of example with references to the accompanying drawings in which:

FIG. 1 is a block circuit diagram of the electrical equipment used with the polarimeter.

FIG. 2 shows an outline plan of the arrangement of the optical system of the polarimeter.

FIG. 3 shows a complete circuit diagram of the electrical equipment, and

Figure 4:
FIGS. 4a–4e show typical waveforms of signals applied to the Faraday cell and received from the detector.
Figure 4:
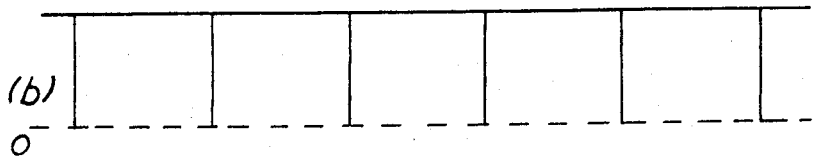
Figure 4:
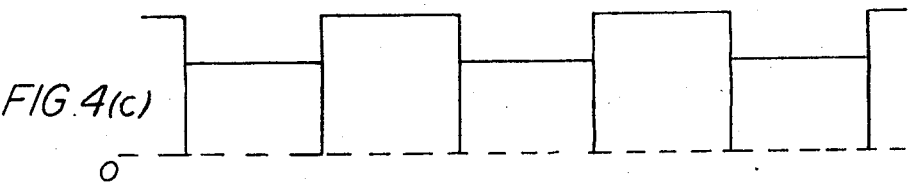
Figure 4:
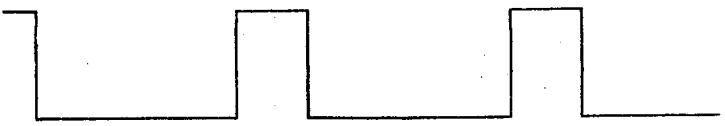
Figure 4:
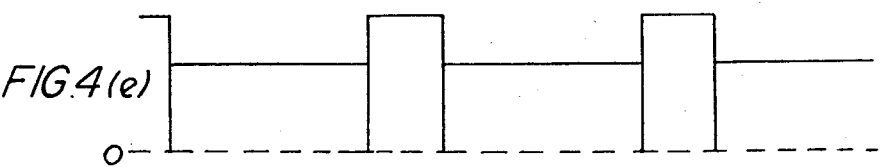

Also shown in FIGURES 1 and 3 are typical waveforms obtained at various points in the circuit during out-of-balance conditions.

Referring now to FIGURE 1 a photo-electric detector D delivers electrical signals via a pulse shaper PS to one input of a phase-sensitive detector P. Applied to a second input of the phase-sensitive detector is the output of a frequency generator FG, which delivers a continuous train of square wave pulses of one-to-one ratio. The output of the frequency generator is also applied to an integrating circuit I. The direct current output from the phase-sensitive detector is superimposed on the output from the integrating circuit before being applied to a trigger circuit T. The output signals from the trigger circuit are passed through an amplifier A to the coil of a Faraday cell F. In order to monitor the current passing through the Faraday cell a meter M and recorder R are provided. Both these instruments will register the average value of the current since neither can respond to the frequency of the modulation signals applied to the Faraday cell.

The optical arrangement of the instrument shown in FIGURE 2 is very similar to known types of apparatus. Lihgt from a light source L passes through a polariser PL which produces a plane polarised beam of light. This light beam is directed upon an analyser AN which has its plane of polarisation perpendicular to that of the polariser so that no light passes through the analyser. A photo-electric detector D is placed in line with the light beam to detect any light passing through the analyser when conditions are changed.

Placed between the polariser and analyser, in my order, are a sample cell or container S and a single Faraday cell F.

FIGURE 3 shows the electrical circuitry of FIGURE 1 in detail.

The actual detection element is a photo-multiplier tube PM shown with its power supply unit PSU. The output signals from the photo-multiplier tube are applied to the base of an amplifier transistor T1. The amplified signals are then applied to the base of a transistor T2 which, together with a transistor T3, forms a Schmidt trigger circuit. This acts as a pulse shaping circuit. The output from the pulse shaper is transformer coupled to a complementary pair of transistors T4 and T5. These two transistors form a phase-sensitive circuit and deliver an output signal the form of which depends on the phase relationship between the signals applied from the photo-multiplier tube and a train of pulses derived from the frequency generator. The output of the phase-sensitive circuit is zero if the two applied signals are in phase at all times, and under circumstances, is in the form of a "square-wave" pulse train. Such a train of pulses is reduced to a direct current potential by a smoothing circuit comprising resistor R and capacitor C. The direct current level depends upon the frequency and amplitude of the signals applied to the smoothing circuit.

The frequency generator is a conventional astable circuit comprising a pair of transistors T6 and T7 and their associated coupling components. The output of the frequency generator, in the form of a train of square waves of one-to-one ratio, is applied to the bases of transistor T4 and T5 of the phase-sensitive circuit, and also to the base of a transistor T8, which is one of two transistors T8, T9 making up an integrating circuit. The output delivered from T9 when a train of symmetrical square waves is applied to T8 is in the form of a triangular or sawtooth waveform. This is superimposed on the direct current output from the phase-sensitive circuit at the base of a transistor T15, and controls the triggering of a second trigger circuit comprising transistors T10 and T11. The instant during a cycle of the saw-tooth waveform at which the trigger circuit changes state depends upon the direct current bias on which the sawtooth is superimposed. If there is no direct current output from the phase-sensitive circuit then the trigger circuit triggers so as to produce a train of square-wave pulses of one-to-one ratio, that is a signal of the same form as that produced by the frequency generator. The output of the trigger circuit is applied via a driver stage comprising transistor T12 to a transformer-coupled push-pull output stage having transistors T13 and T14. The coil on the Faraday cell F forms the load of the output circuit. As already described a meter M and a recorder R may be provided to indicate and record the average value of the current flowing in the Faraday cell coil.

The operation of the circuit will now be described with reference to FIGURES 1, 3 and 4 of the drawings. FIGURE 4a shows the modulation waveform which is initially applied to the Faraday cell coil. If no sample is present in the polarimeter then the application of this waveform to the Faraday cell causes the plane of polarisation of the light passing through the Faraday cell to be rotated by equal amounts in opposite directions. Since the photo-multiplier tube is unable to determine the direction of rotation of the plane of polarisation of the light reaching it, it appears to receive constant illumination. In fact, due to the finite switching time of the frequency generator, very short negative-going spikes will appear on the photo-multiplier tube current waveform as shown in FIGURE 4b. These will fall to zero current at the instant when the photo-multiplier tube is not illuminated at all.

When no sample is present the signal from the frequency generator and that from the detector will be in phase at all times. As already stated, this results in zero direct current output from the phase-sensitive circuit, and hence the modulation waveform applied to the Faraday cell is the same as that generated by the frequency generator. The direct current output from the phase-sensitive detector is proportional to the ratio of the wave-form received from the photo-multiplier tube, and the magnitude of the direct current output decreases as the wave-form becomes more symmetrical.

If a sample of material producing a rotation of the plane of polarisation in one direction or the other is placed in the sample container then the deflection of the plane of polarisation of the light reaching the analyser AN (FIGURE 2) will no longer be symmetrical. The deflection will be greater in the direction in which the sample causes rotation than in the opposite direction. The signal delivered by the photo-multiplier tube will then be of the form shown at FIGURE 4c and in the appropriate inset on FIGURES 1 and 3. The insets on these two figures illustrate the operation of the circuit when a sample is present in the polarimeter. The Schmdit trigger circuit serves to amplify the signal from the photo-multiplier tube and to remove the negative-going spikes. The output from the pulse shaper is applied to the phase-sensitive circuit, which produces a direct current output signal. This has the saw-tooth wave-form from the integrating circuit superimposed upon it and thus varies the point at which the second trigger circuit changes state. The resulting modulation wave-form applied to the Faraday cell coil is thus of the form shown in FIGURE 4d.

As a result of the changed modulation wave-form, the output from the photo-multiplier tube takes up the form shown in FIGURE 4e. This results in a reduced direct current output from the phase-sensitive circuit, and hence the modulation wave-form becomes less symmetrical. This process continues until a balance condition is reached at which the direct current output from the phase-sensitive detector becomes steady. The meter M then measures the average value of the current in the Faraday cell coil, and may be calibrated directly in angle of rotation produced by the sample. The recorder R will also give a corresponding record.

If the sample produces rotation of the plane of polarisation in the opposite direction to that considered above, then the direct current output from the phase sensitive circuit will be of the opposite polarity, and the modulation wave-form will become asymmetrical in the opposite sense.

It is possible to use any suitable type of photo-electric detector, though photo-multiplier tubes are to be preferred where small intensities of illumination are encountered, on account of their greater sensitivity. The circuit may also include means for controlling the power supplied to the photo-multiplier tube as a means of controlling its sensitivity.

Although the embodiment described above uses a square wave control signal, it is possible to use other control signals of symmetrical shape, such as sine-wave or triangular-wave signals for example. However, a square-wave control signal is to be preferred owing to the resulting circuit simplifications.

I claim:

1. In a polarimeter having a single Faraday cell and a photodetector receiving light passing through a sample and said Faraday cell, means for applying to the Faraday cell an oscillating electric control signal having a square wave-form symmetrically disposed about a reference axis and with equal positive and negative pulse widths, comprising a frequency generator, an integrating circuit supplied thereby and delivering an output having a saw-tooth wave-form, and a trigger circuit responsive to the output of the integrating circuit to develop the control signals; and ratio adjustment means for adjusting the ratio of the positive pulse width to the negative pulse width in any complete cycle of oscillation comprising a converter by which the output of said light-receiving detector is converted into a direct current potential, and said trigger circuit to which the direct current potential and the output of said integrating means are applied to adjust the operation of the trigger circuit and thereby the pulse width ratio of the control signal.

2. In a polarimeter having a single Faraday cell and a photodetector receiving light passing through a sample and said Faraday cell, means for applying to the Faraday cell an oscillating electric control signal having a square wave-form symmetrically disposed about a reference axis and with equal positive and negative pulse widths, and adjustment means for adjusting the ratio of the positive pulse width to the negative pulse width in any complete cycle of oscillation comprising a converter by which the output of said light-receiving detector is converted into a direct current potential, and means for adjusting the ratio of said control signal in accordance with the level of said direct current potential and supplying the adjusted signal to said Faraday cell for control thereof.

3. In a polarimeter having a single Faraday cell and a photodetector receiving light passing through a sample and said Faraday cell, signal means for providing an oscillating electric control signal having a square wave-form symmetrically disposed about a reference axis and with equal positive and negative pulse widths, and means for adjusting the ratio of the positive pulse width to the negative pulse width in any complete cycle of oscillation comprising a converter by which the output of said light-receiving detector is converted into a direct current potential and means for generating an oscillating signal, said signal and adjusting means including trigger means responsive to superimposing of said oscillating signal and said direct current potential for providing and adjusting said control signal as to ratio in accordance with said direct current potential, and means supplying the adjusted signal to said Faraday cell for control thereof.

References Cited

UNITED STATES PATENTS

| | | | |
|---|---|---|---|
| 3,048,714 | 8/1962 | Poole | 307—88.5 |
| 3,050,639 | 8/1962 | Tate | 307—88.5 |
| 3,152,306 | 10/1964 | Cooper et al. | 307—88.5 |
| 3,181,074 | 4/1965 | Cotterill | 307—88.5 |
| 3,211,926 | 10/1965 | Frysinger | 307—88.5 |
| 3,230,820 | 1/1966 | Wisnieff | 88—14 |
| 3,257,894 | 6/1966 | Grosjean | 88—14 |
| 3,041,921 | 7/1962 | Pickels et al. | 88—14 |

OTHER REFERENCES

King et al.: Sensitive Method for Measuring Small Rotations of a Distant Object, J. of Scientific Instruments, U. 38, pp. 207–208, May 1961.

JEWELL H. PEDERSEN, *Primary Examiner.*

W. A. SKLAR, *Assistant Examiner.*